(12) United States Patent
Strauss et al.

(10) Patent No.: US 9,021,313 B2
(45) Date of Patent: Apr. 28, 2015

(54) PRIORITY-ASSIGNMENT INTERFACE TO ENHANCE APPROXIMATE COMPUTING

(71) Applicant: Microsoft Corporation, Redmond, WA (US)

(72) Inventors: Karin Strauss, Seattle, WA (US); Adrian Sampson, Seattle, WA (US); Luis Henrique Ceze, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 13/688,080

(22) Filed: Nov. 28, 2012

(65) Prior Publication Data

US 2014/0143780 A1    May 22, 2014

Related U.S. Application Data

(60) Provisional application No. 61/729,240, filed on Nov. 21, 2012.

(51) Int. Cl.
| | | |
|---|---|---|
| *G06F 11/00* | (2006.01) | |
| *G06F 9/46* | (2006.01) | |
| *G06F 11/16* | (2006.01) | |
| *G06F 11/10* | (2006.01) | |
| *G06F 17/10* | (2006.01) | |

(52) U.S. Cl.
CPC .............. *G06F 9/46* (2013.01); *G06F 11/1666* (2013.01); *G06F 11/1044* (2013.01); *G06F 11/10* (2013.01); *G06F 17/10* (2013.01)

(58) Field of Classification Search
CPC .. G06F 11/1666; G06F 11/10; G06F 11/1044
See application file for complete search history.

(56) References Cited

U.S. PATENT DOCUMENTS

| 6,473,869 | B2 | 10/2002 | Bissett et al. | |
|---|---|---|---|---|
| 7,043,671 | B2 * | 5/2006 | Bader et al. | 714/701 |
| 7,523,362 | B2 * | 4/2009 | Bader et al. | 714/701 |
| 7,987,415 | B2 * | 7/2011 | Niu et al. | 714/799 |
| 2003/0167425 | A1 * | 9/2003 | Bader et al. | 714/100 |
| 2006/0282748 | A1 * | 12/2006 | Bader et al. | 714/776 |
| 2007/0180343 | A1 * | 8/2007 | Kang et al. | 714/746 |

(Continued)

OTHER PUBLICATIONS

Ferraro-Petrillo, et al., "Data Structures Resilient to Memory Faults: An Experimental Study of Dictionaries", In Proceedings of the 9th International Conference on Experimental Algorithms, May 20, 2010, 12 pages.

(Continued)

*Primary Examiner* — Charles Ehne
(74) *Attorney, Agent, or Firm* — Gregg Wisdom; Judy Yee; Micky Minhas

(57) ABSTRACT

A system and method are provided for enhancing approximate computing by a computer system. In one example, an interface is provided comprising a variable-identifier module and a bit-priority module. The variable-identifier module is configured to identify one or more variables of data that are to be processed by the computer system with approximate precision. Approximate precision is a precision level at which a hardware device does not guarantee full data-correctness for the one or more variables. The bit-priority module is configured to assign bit-priorities to the one or more variables. The bit-priorities include relative levels of importance among bits of each of the one or more variables. The relative levels of importance include at least high-priority bits and low-priority bits.

18 Claims, 6 Drawing Sheets

(56) References Cited

U.S. PATENT DOCUMENTS

| | | | | |
|---|---|---|---|---|
| 2007/0204205 | A1* | 8/2007 | Niu et al. | 714/780 |
| 2010/0091909 | A1 | 4/2010 | Ericson et al. | |
| 2012/0011413 | A1* | 1/2012 | Liu et al. | 714/746 |
| 2012/0110419 | A1 | 5/2012 | Ni et al. | |
| 2012/0221774 | A1 | 8/2012 | Atkisson et al. | |
| 2012/0266041 | A1 | 10/2012 | Wang et al. | |
| 2014/0040679 | A1* | 2/2014 | Shimizu et al. | 714/54 |

OTHER PUBLICATIONS

Latif, et al., "Soft Error Protection via Fault-Resilient Data Representations", In 3rd IEEE of Workshop on Silicon Errors in Logic—System Effects, Apr. 2007, 6 pages.

Aumann, et al., "Fault Tolerant Data Structures", In Proceedings on 37th Annual Symposium on Foundations of Computer Science, Oct. 14, 1996, 10 pages.

Silvestri, Francesco, "Resilient Data Structures", In Workshop on Recent Advances in Data Structures, Dec. 17, 2011, 88 pages.

Milojicic, et al., "Increasing Relevance of Memory Hardware Errors a Case for Recoverable Programming Models", In Proceedings of the 9th workshop on ACM SIGOPS European workshop: Beyond the PC: New Challenges for the Operating System, Sep. 17, 2000, 6 pages.

"International Search Report & Written Opinion for PCT Patent Application No. PCT/US2013/071063", Mailed Date: Aug. 29, 2014, 13 Pages. (MS# 337682.03).

Esmaeilzadeh, et al., "Architecture Support for Disciplined Approximate Programming", In Proceedings of the Seventeenth International Conference on Architectural Support for Programming Languages and Operating Systems Mar. 3, 2012, 12 Pages.

Sampson, et al., "Approximate Storage in Solid-State Memories", In Proceedings of the 46th Annual IEEE/ACM International Symposium on Micro architecture, Dec. 7, 2013, 12 Pages.

Sampson, et al., "Enerj: Approximate Data Types for Safe and General Low-Power Computation", In Proceedings of the 32nd ACM SIGPLAN Conference on Programming Language Design and Implementation, Jun. 4, 2011, pp. 164-174.

"Written Opinion Received for PCT Patent Application No. PCT/US2013/071063", Mailed Date: Jan. 14, 2015, 10 Pages.

Request for International Preliminary Examination under Chapter II PCT filed Nov. 26, 2014 in International Patent Application No. PCT/US2013/071063, 18 pages.

* cited by examiner

PRIORITY-ASSIGNMENT INTERFACE TO ENHANCE APPROXIMATE COMPUTING

CLAIM OF PRIORITY

The present application claims priority to U.S. Provisional Patent Application No. 61/729,240, entitled "Priority-Assignment Interface To Enhance Approximate Computing," filed Nov. 21, 2012, which application is incorporated by reference herein in its entirety.

BACKGROUND

For data storage (e.g., cache, main memory, long term storage, etc.), there is typically a trade-off between quality of service and error correction. Quality of service refers to a level of precision with which a computer system (e.g., storage system) processes data. Error correction refers to processes a hardware system performs in order to correct errors in data. As the quality of service (e.g., precision of data) increases, the amount of error-correction that a hardware device (e.g., memory device) must perform typically goes up. Conversely, as less quality of service is needed, the amount of error-correction that a hardware device must perform typically goes down.

A computer system may be configured to compute with full data-correctness-guarantees (e.g., high-precision). Computing with full data-correctness-guarantees refers to maintaining all, or substantially all, bits of the data. However, computing full data-correctness-guarantees, on a full-time basis, is often not practical for many computing operations. Hardware (e.g., a memory device) typically provides strong guarantees for error correction. Software typically relies completely on hardware to maintain full data error-correction guarantees. Such complete reliance on hardware is demanding on the hardware. The demand can lead to memory devices that operate more slowly. Perhaps worse, the memory devices may also experience shorter life spans. For example, precise flash memory operation may cause quicker wear out due to the need for a larger number of write iterations. When the hardware cannot maintain the error-correction guarantees, the hardware issues a fatal error. Then, neither the hardware nor the software can proceed with normal computing operations.

Full data-correctness-guarantees (e.g., high-precision operations with an effort to maintain the precision of all bits of data), which are often required by hardware, are not always needed for software applications. Some software applications can tolerate errors in some of their data structures, such as, for example, picture data, audio data, video data, and/or most other data that a user decides to store. A computer can process these types of data with approximate precision and, at the same time, maintain virtually no perceptible difference in the user experience during the processing of the data. In one example, approximate storage refers to a computer system storing data in memory, and later the memory device returning approximately the data that was stored in that memory. Approximate precision is the precision with which the memory device returns approximately the data that was stored in the memory. Approximate precision is a precision level at which the memory device does not guarantee full data-correctness for one or more variables of data. For example, the memory device does not guarantee all bits of the data are correct.

SUMMARY

Disclosed herein are systems and methods for enhancing approximate computing. In approximate computing (e.g., approximate storage) where some data structures can tolerate errors, some of the bits composing the variables in data structures may be more important than others. For example, in integer variables, the signal and high order bits are more important than lower order bits. Embodiments of the present technology provide interfaces to specify bit importance within variables of data, and provide an infrastructure for applying the interfaces in approximate storage operations and/or other computing operations. In one example, the infrastructure may allocate more error correction resources to the data indicated by the present technology to be of higher priority.

In an example, the present technology relates to a system for enhancing approximate computing by a computer system, the system comprising: one or more variables that are to be processed by the computer system with approximate precision, wherein approximate precision is a precision level at which a hardware device does not guarantee full data-correctness for the one or more variables, and wherein the one or more variables are assigned bit-priorities including relative levels of importance among bits of each of the one or more variables, and wherein the relative levels of importance include at least high-priority bits and low-priority bits.

In another example, the present technology relates to a computer-implemented method for enhancing approximate computing by a computer system, the computer-implemented method comprising: identifying one or more variables of data that are to be processed by the computer system with approximate precision, wherein approximate precision is a precision level at which a hardware device does not guarantee full data-correctness for the one or more variables; and assigning bit-priorities to the one or more variables, wherein the bit-priorities include relative levels of importance among bits of each of the one or more variable, and wherein the relative levels of importance include at least high-priority bits and low-priority bits.

In yet another example, the present technology relates to one or more computer-readable storage media comprising one or more instructions to enhance approximate computing by a computer system, wherein the one or more instructions, when executed, direct one or more processors to perform actions comprising: assigning bit-priorities to one or more variables that are to be processed by the computer system with approximate precision, wherein approximate precision is a precision level at which a hardware device does not guarantee full data-correctness for the one or more variables, and wherein the bit-priorities include relative levels of importance among bits of each of the one or more variables, and wherein the relative levels of importance include at least high-priority bits and low-priority bits; and providing instructions for communication between the hardware device and a software module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Implementations of the present technology are described with reference to FIGS. 1-10, which relate to systems and methods to enhance approximate computing (e.g., approximate storage).

General Overview

In approximate computing (e.g., approximate storage) where some data structures can tolerate errors, some of the bits composing the variables in data structures are more important than others. For example, in integer variables, the signal and high order bits are more important than lower order bits. Some programming models can indicate which data structures and variables can tolerate errors. However, these programming models are not designed to provide an interface to specify relative bit importance within those variables.

Accordingly, the present technology also provides interfaces to specify bit importance within variables of data, and provides an infrastructure for applying the interfaces in approximate storage operations and/or other computing operations. As described below with reference to FIGS. 3-5, the system can specify bit-priorities by using a software interface (e.g., programming language extensions), a hardware-software interface (e.g., hardware-software extensions), and/or a hardware interface (e.g., hardware extensions). The system can use the bit-priorities to enable more efficient error-correction operations that alleviate stress from the hardware devices (e.g. memory devices). The system can also use the bit-priorities for other approximate computing operations where appropriate.

Figure 1:
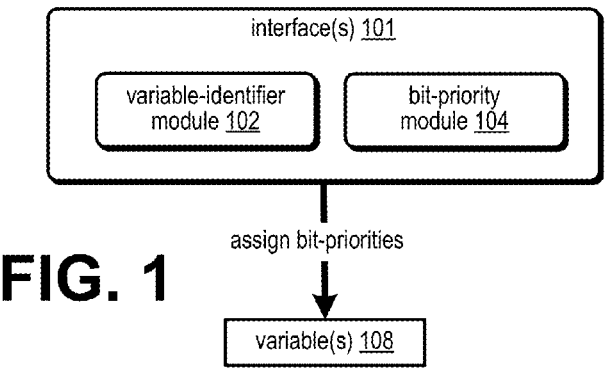
FIG. 1 is a conceptual diagram of an example interface to enhance approximate computing.

FIG. 1 is a conceptual diagram of an example interface 101 to enhance approximate computing. The interface 101 is a high-level example of an interface and can be further configured in different examples, as discussed below with reference to FIG. 6. The interface 101 may include without limitation a variable-identifier module 102 and a bit-priority module 104. A module may be hardware, software or a combination of hardware and software. In examples, a developer may identify variables amenable to approximation and priority of bits within the variables. The programming language creator and the compiler writer may give the programmer a few pre-defined constructs. The programming language and compiler implementation may support declaring variables with a type that has bit priorities, specifying new types, or attaching bit priorities to a single variable.

The variable-identifier module 102 is configured to identify variables, variable types, and/or variable groups that are to be processed according to approximate precision. The system can be configured to indicate generally which data structures and/or variables can tolerate errors by using an available programming model. However, available programming models do not provide interfaces to specify relative bit importance within those variables. Accordingly, the bit-priority module 104 is configured to assign and/or apply bit-priorities to variables 108 (e.g., variables, variable types, and/or variable groups). The bit-priorities module 104 may thereby configure the interface 101 to regulate approximate precision operations of a computer system. As described below with reference to FIG. 6, the computer system may include various interfaces 101 in various layers (e.g., software layer, hardware-software layer, and hardware layer).

Although software applications do not always require full data-correctness-guarantees, software applications may still be limited by constraints of hardware devices. For example, a solid-state chip manufacturer may specify that each position in its storage array will return the value stored by the first $10^4$ writes. After that, the device can no longer be used. The specifications also say that it will not be able to guarantee return the correct value for a small fraction of the reads, in which case it raises an exception (but does not return the value with small deviations from the original value).

Figure 2:
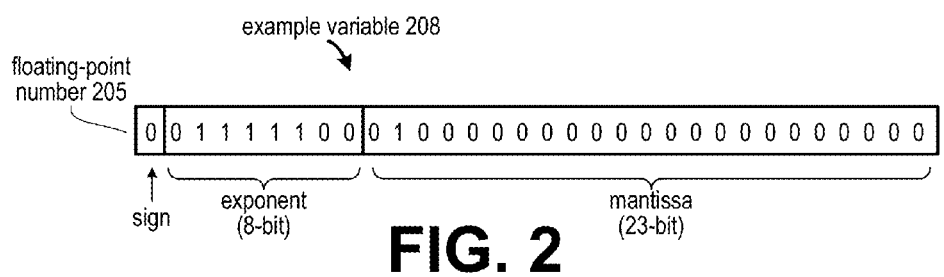
FIG. 2 is a diagram of an example variable, which may be subjected to approximate computing operations of the present technology.

FIG. 2 is a diagram of an example variable 208, which may be subjected to approximate computing operations of the present technology. The example variable 208 includes a floating-point number 205. In another implementation, a variable can include an integer (not shown). Many hardware floating-point units use the Institute of Electrical and Electronics Engineers (IEEE 754) standard. Floating-point numbers, according to the IEEE 754 standard, consist of three fields: a sign bit, a biased exponent, and a fraction. The following example illustrates the meaning of each. The decimal number 0.1562500 represented in binary is 0.00101 in base-2 (that is, ⅛+1/32 in decimal). Analogous to scientific notation, where numbers are written to have a single non-zero digit to the left of the decimal point, this number is rewritten so it has a single 1 bit to the left of the "binary point". The number is then multiplied by the appropriate power of 2 to compensate for shifting the bits left by three positions, as shown in the following Equation 1:

$$0.00101_2 = 1.01_2 \times 2^{-3} \qquad \text{Equation 1.}$$

In Equation 1, the fraction is 0.012 and the exponent is −3. In the example of FIG. 2, the three fields in the IEEE 754 representation of this number are as follows. A sign=0, because the number is positive. (1 indicates negative.) A biased exponent=−3 plus the "bias". In single precision, the bias is 127, so in this example the biased exponent is 124. In double precision, the bias is 1023, so the biased exponent in this example is 1020. A fraction=0.01000 . . . in base-2.

The IEEE 754 Standard adds a bias to the exponent so that numbers can in many cases be compared conveniently by the same hardware that compares signed 2's-complement integers. Using a biased exponent, the lesser of two positive floating-point numbers will come out "less than" the greater following the same ordering as for sign and magnitude integers. If two floating-point numbers have different signs, the sign-and-magnitude comparison also works with biased exponents. However, if both biased-exponent floating-point numbers are negative, then the ordering must be reversed. If the exponent were represented as, say, a 2's-complement number, comparison to see which of two numbers is greater would not be as convenient. In the example of FIG. 2, the mantissa is 23 bits, where the leading 1 bit is omitted. Since all numbers except zero start with a leading 1, the leading 1 is implicit and does not need to be stored, thereby providing an extra available bit of precision. In another implementation, the mantissa includes 24 bits.

According to hardware standards (e.g., JEDEC standards, IEEE standards, etc.), the internal precision of a floating-point number is to be maintained in its entirety at the hardware level in order to guarantee data-correctness and/or to ensure proper rounding. Despite strict hardware constraints, the present technology enhances approximate computing by the computer system by using interfaces for approximate computing, as further described below.

Example Implementations of Bit-Priority Modules

Figure 3:
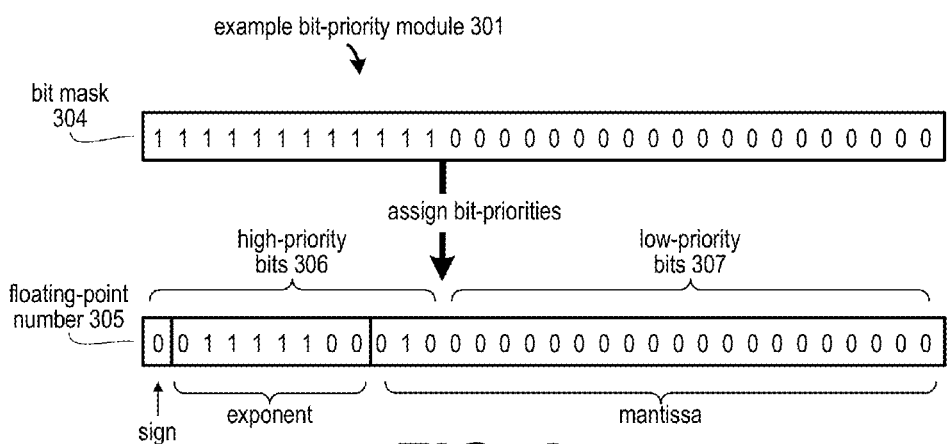
FIG. 3 is a conceptual diagram of an example bit-priority module including a bit mask.

FIG. 3 is a conceptual diagram of an example bit-priority module 301 including a bit mask 304. The bit-priority module 301 is one implementation of the bit-priority module 104 of FIG. 1. The bit mask 304 includes a pattern of binary values that the system can combine or otherwise associate with a variable, for example, floating-point number 305. In another implementation (not shown), the variable can be an integer or another type of value. Where the bit mask 304 has a bit-value of one (1), the bit-priority module 301 can assign the corresponding bit in the floating-point number 305 as being among high-priority bits 306. Where the bit mask 304 value has a bit-value of zero (0), the bit-priority module 301 can assign the corresponding bit in the floating-point number 305 as being among low-priority bits 307.

In this example, the bit-priority module 301 uses the bit mask 304 to assign the sign bit, the exponent bits, and three bits of the mantissa as being among high-priority bits 306. The bit-priority module 301 uses the bit mask 304 to assign twenty bits of the mantissa as being among low-priority bits. In another implementation, a bit-priority module can use a bit mask to set any allowable number of high-priority bits and/or any allowable number of low-priority bits. Accordingly, the bit-priorities include relative importance levels (e.g., high-priority bits and low priority bits) among bits of each of the one or more variables (e.g., floating-point number 305).

The bit-priority module 301 can be designed by a software programmer For example, while writing code for a software program, a software programmer can manage bit-priorities of designated floating-point numbers by setting the bits of the bit mask 304. The system can receive the bit mask 304 as part of a programming language extension, as designed by a programmer for example. In examples, the bit mask 304 is not attached to the variable (e.g., floating-point number 305), but is rather stored at a different location than the variable. However, in further examples, the bit mask may be stored together with the variable. As described below with reference to FIG. 6, the bit mask 304 can be implemented in various configurations of an interface for enhancing approximate computing (e.g., approximate storage).

The bit-priorities may allow the computer system to make more efficient use of processing circuitry of a hardware device (e.g., memory device) of the computer system by providing low-priority bits for which the hardware device is not obligated to guarantee correctness. For example, if a memory device of the system has limited resources (e.g., limited circuitry) to perform error-correction operations, the memory device can perform error-correction on higher-priority bits 306 and neglect error-correction operations on low-priority bits 307. When one considers that a memory device performs error-correction operations on a multitude of variables, such as floating-point number 305, then the savings of hardware resources are readily apparent.

Figure 4:
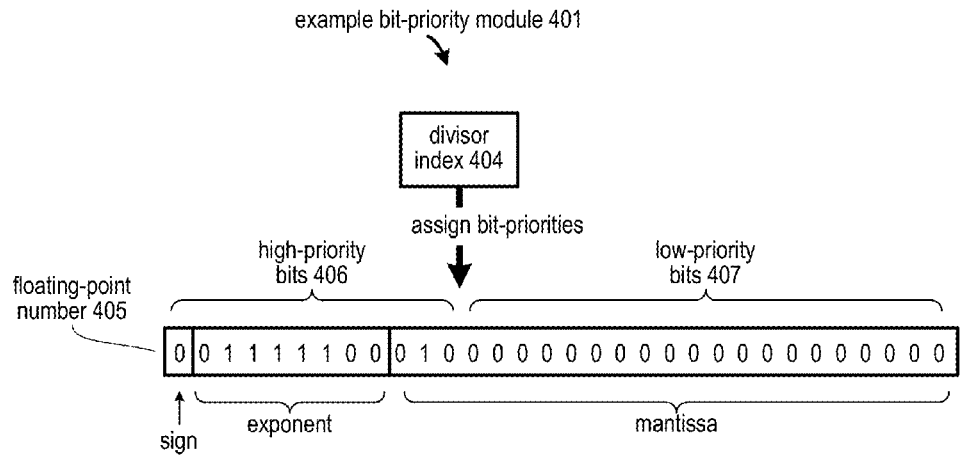
FIG. 4 is a conceptual diagram of another example bit-priority module including a divisor index.

FIG. 4 is a conceptual diagram of another example bit-priority module 401 including a divisor index 404. The bit-priority module 401 is one implementation of the bit-priority module 104 of FIG. 1. The divisor index 404 includes a mechanism (e.g., pointer and/or address) that identifies a location within a variable, for example, floating-point number 405. In another implementation (not shown), the variable can be an integer or another type of value. The system can use the location identified by the divisor index 404 to set bit-priorities of the floating point-number 405.

The bit-priority module 401 can be designed by a software programmer For example, while writing code for a software program, a software programmer can manage bit-priorities of designated floating-point numbers by setting the bits of the divisor index 404. The system can receive the divisor index 404 as part of a programming language extension, as designed by a programmer for example. In one implementation, the divisor index 404 is not attached to the variable (e.g., floating-point number 405), but is rather stored at a different location than the variable. However, in further implementations, the divisor index 404 may be stored together with the variable. As described below with reference to FIG. 6, the divisor index 404 can be implemented in various configurations of an interface for enhancing approximate computing (e.g., approximate storage).

Using the divisor index 404, the bit-priority module 401 can be configured to assign each bit located on one side of the divisor index 404 as being among high-priority bits 406. The bit priority module 401 can be configured to assign each bit located on the other side of the divisor index 404 as being among low-priority bits 407. In this example, the bit-priority module 401 uses the divisor index 404 to assign the sign bit, the exponent bits, and three bits of the mantissa as being among high-priority bits 406. The bit-priority module 401 uses the divisor index 404 to assign twenty bits of the mantissa as being among low-priority bits. In another implementation, a bit-priority module can use a divisor index to set any allowable number of high-priority bits and/or any allowable number of low-priority bits.

Figure 5:
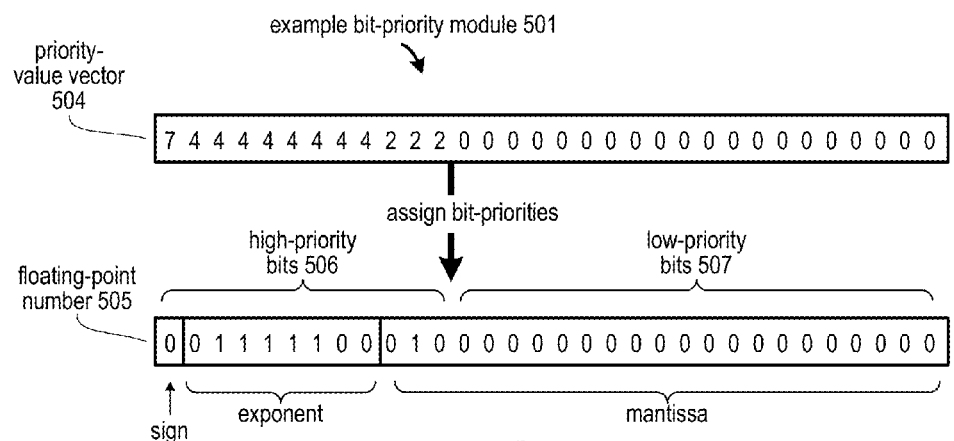
FIG. 5 is a conceptual diagram of yet another example bit-priority module including a priority-value vector.

In embodiments described above, bits may be assigned a binary priority value, i.e, a bit is a priority or it is not. FIG. 5 is a conceptual diagram of yet another example bit-priority module 501 including a priority-value vector 504. The bit-priority module 501 is one implementation of the bit-priority module 104 of FIG. 1. The priority-value vector 504 includes a pattern of values that the system can combine with a variable, for example, floating-point number 505. In another implementation (not shown), the variable can be an integer or another type of value. The system can combine or otherwise associate the priority-value vector 504 with the floating-point number 505. For example, at a corresponding bit where the priority-value vector 504 has a value greater than a predetermined value (e.g., greater than a value of 1, etc.), the priority-device 501 can assign the corresponding bit in the floating-point number 505 as being among high-priority bits 506. Where the priority-value vector 504 has a value less than a predetermined value (e.g., less than a value of 1), the priority-device 501 can assign the corresponding bit in the floating-point number 505 as being among low-priority bits 506. In this example, the bit-priority module 501 uses the priority-value vector 504 to assign the sign bit, the exponent bits, and three bits of the mantissa as being among high-priority bits 506. The bit-priority module 501 uses the bit mask 504 to assign twenty bits of the mantissa as being among low-priority bits. In another implementation, a bit-priority module can use a priority-value vector to set any allowable number of high-priority bits and/or any allowable number of low-priority bits.

Further, the priority-value vector 504 allows the bit-priority module 501 to assign relative priorities to bits of the floating-point number 505. In this example, the bit-priority module 501 assigns a relative decimal value of 7 to the sign bit, assigns a relative decimal value of 4 to each mantissa bit, assigns a relative decimal value of 2 to three bits of the mantissa, and assigns a relative value of zero (0) to twenty bits of the mantissa. Note the system can represent the decimal value of 7 in binary as 111, can represent the decimal value of 4 in binary as 100, and can represent the decimal value of 2 in binary as 010, and so on. A hardware device can interpret these relative values to mean the sign bit has the most importance; the exponent bits are less important than the sign bit; the three highest bits of the mantissa are less important than the exponent; and twenty bits of the mantissa are less important than the three highest bits of the mantissa. In another implementation, a bit-priority module can use a priority-value vector to set any allowable number of high-priority bits, any allowable number of low-priority bits, and/or any allowable combination of relative priorities.

The bit-priority module 501 can be designed by a software programmer For example, while writing code for a software program, a software programmer can manage bit-priorities of designated floating-point numbers by setting the values of the priority-value vector 504. The system can receive the priority-value vector 504 as part of a programming language extension, as designed by a programmer for example. The priority-value vector 504 may not be attached to the variable (e.g., floating-point number 505), but is rather located stored at a different location than the variable. As described below with reference to FIG. 6, the priority-value vector 504 can be implemented in various configurations of an interface for enhancing approximate computing (e.g., approximate storage).

Example Implementations of Interfaces for Approximate Computing

This section provides examples of interfaces for approximate computing. An interface may be located at a few different layers, such as, for example, a software layer, a hardware-software layer, and a hardware layer. The interfaces are configured to function collaboratively to enhance approximate computing operations at a hardware device (e.g., memory device).

Figure 6:
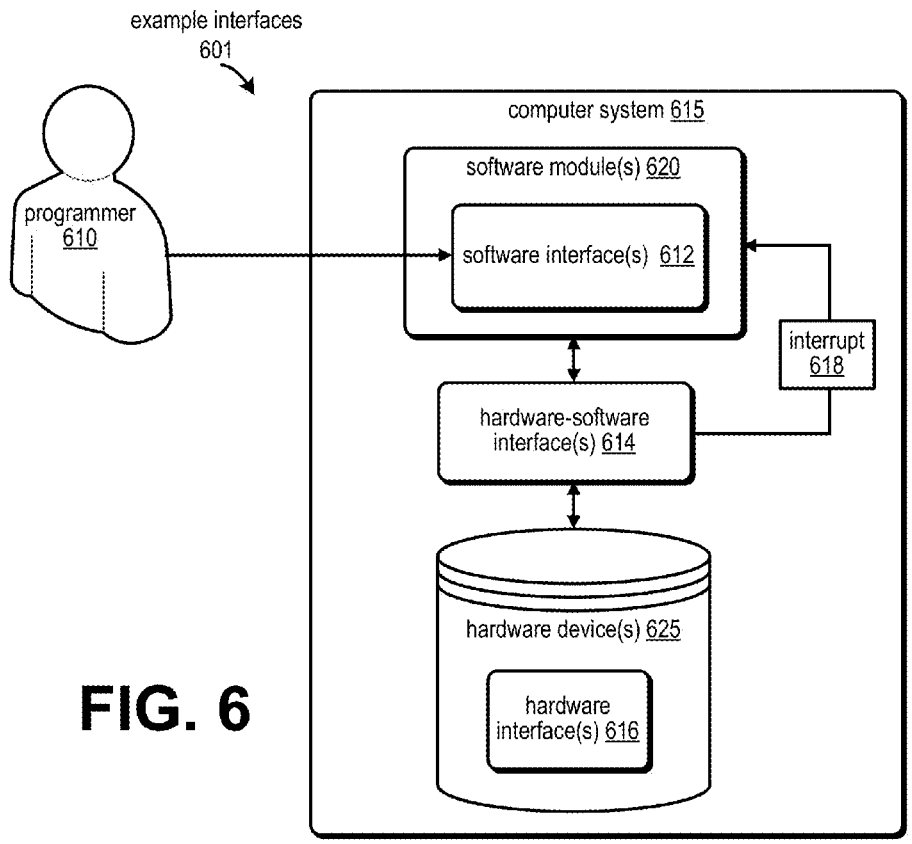
FIG. 6 is a conceptual diagram of a computer system including example interfaces located at various layers.

FIG. 6 is a conceptual diagram of a computer system 615 including example interfaces 601 located at various layers. The computer system 615 includes without limitation one or more software modules 620 and one or more hardware devices (e.g., memory devices). The software modules 620 include one or more software interfaces 612. The hardware devices 625 include one or more hardware interfaces 616. The software modules 620 may be coupled to the hardware devices 625 via one or more hardware-software interfaces 614, among other coupling avenues. A general description of an interface is described above with reference to FIG. 1.

A programmer 610 can provide input to design the software modules 620 including the software interface 612. As described above with reference to FIG. 1, by using an available programming model, the computer system 615 can be configured to indicate which data structures and/or variables can tolerate errors. For example, the software interface 612 can include one or more programming language extensions including syntax that specifies which variables, variables types, and/or variable groups can be processed with approximate precision. An extension is a feature that a programmer can add to a standard programming language. For example, the software interface 612 can include a variable-identifier module (e.g., the variable-identifier module 102 of FIG. 1) including a programming language extension configured to identify floating-point numbers of data (e.g., picture data, video data, and/o audio data) that can be processed with approximate precision. In an object-oriented programming language (e.g., C, C++, etc.) for example, an extension can specify a particular variable, variable type, and/or variable group that are to be processed with approximate precision. An example of a particular variable is the floating number 205 of FIG. 5. An example of a variable type is floating-point numbers of data. An example of a variable group is a set of designated variables located at designated addresses in memory.

Within each specification of a variable, variable type, or variable group, an extension can further declare bit-priorities (e.g., high-priority and low-priority) for the variable, variable type, and/or variable group. A software interface can assign bit-priorities to variables by using a bit-priority module (e.g., the bit-priority module 104 of FIG. 1). As described above with reference to FIGS. 3-5, examples of a bit-priority module include without limitation a bit mask, a divisor index, and/or a priority-value vector.

By using the programming language extensions of the software interface 612 including the bit-priorities, a compiler can generate instructions for communication between the software modules 620 and the hardware devices 625 (e.g., memory devices), for indicating the variables available for approximate computing (e.g., see FIG. 1), and for indicating the bit-priorities of those variables (e.g., see FIGS. 3-5). Accordingly, by using the software interface 612 including programming language extensions having bit-priorities, the programmer 610 can manage, at least in part, the configuration of the hardware-software interface 614.

In one implementation, the hardware-software interface 614 includes extensions to an instruction set architecture (ISA). An ISA is a part of a processor of the computer system 615 that is visible to the programmer 610 or compiler writer. Accordingly, in one implementation, the hardware-software interface 614 can receive instructions by way of a more direct path (not shown) from the programmer 610, as opposed to a compiler generating instructions for the hardware-software 614 by using input from the software modules 620. An ISA is a part of the computer architecture related to programming, including the native data types (e.g., variable types), instructions, registers, addressing modes (e.g., range of addresses indicating bit-priorities), memory architecture, interrupt and exception handling, and/or external input/output (I/O). An ISA includes a specification of the set of the machine language (e.g., opcodes), and the native commands implemented by a particular processor of the computer system 615. If the bit priorities programmed at the software interface 612 are unacceptable for the hardware device 625, the hardware-software interface 614 enables the hardware device 625 to send an interrupt 618 or another communication to the software module 620 in order to indicate the bit-priorities are unacceptable for the hardware device 625. The bit-priorities may be unacceptable, for example, if, when the variable priorities are first presented to the hardware, the priorities violate the hardware specification. In a further example, the hardware may accept the approximate variable for storage, but then at some point run out of error correction resources and can no longer honor the priorities. At this point, it should also interrupt the processor to notify it (or use some other notification mechanism, perhaps sending a flag with the value returned).

The hardware interface 616 is configured with instructions for approximate computing at a hardware layer. In one implementation, the hardware interface includes one or more extensions that specify bit-priorities according to regions of memory, for example, a page of memory (e.g., kilobyte(s) of memory) or other region of memory. The hardware interface 616 can include one or more extensions to a page table or an independent table that can record information about how memory regions are associated to bit-priorities for error-correction operations. The extension for a page table includes extra information the page table stores or information to which the page table points. An extension for an independent table includes ranges of addresses that the computer system 615 can search, and further includes bit-priorities associated with each range of addresses. The independent table may be implemented and indexed by other methods in further embodiments.

The hardware interface 616 can further, or alternatively, include a state machine or logic circuitry that manages the available error-correction entries of a memory region and manages these correction entries such that bit priorities are met. For example, the state machine or hardware logic circuitry configures the computer system 615 to allocate error-correction resources according to bit-priorities, where the more important bits have a higher priority in the allocation of error-correction resources. Accordingly, the hardware device 625 can use the bit-priorities to protect as much as possible the high-priority bits, for example, in error-correction operations.

The hardware interface 616 can receive, at a compile time, bit-priorities from the hardware-software interface 614, which in turn can receive bit priorities from the software interface 612, as described above. Accordingly, by using the software interface 612 including programming language extensions having bit-priorities, the programmer 610 can manage, at least in part, the configuration of the hardware interface 616, as well as the hardware-software interface 614.

Although approximate computing can include approximate storage operations, the present technology is not limited thereto. Approximate computing of the present technology can also include other computing operations, such as, for example, arithmetic operations in which bits do not have to be correct at some bits. For example, in particular addition operations where full precision is not required, the computer system 615 can use bit-priorities to ensure computing resources are allocated to ensure high-priorities bits are correct before resources are allocated for low-priority bits.

Method Overview

Figure 7:
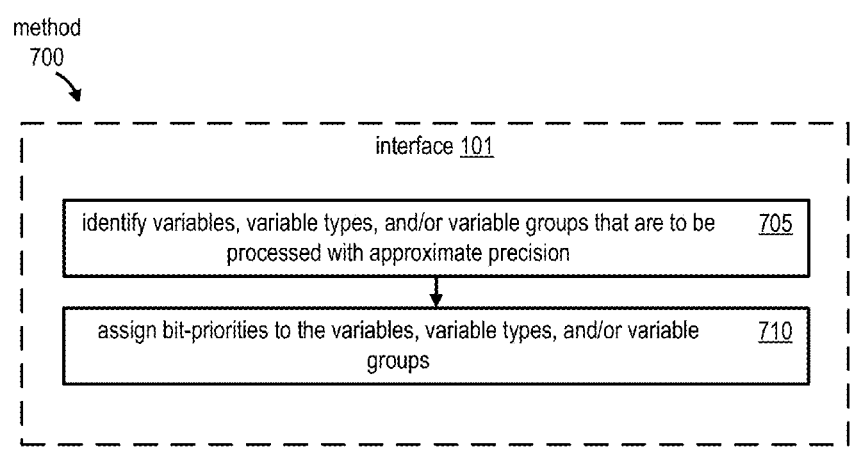
FIG. 7 is a flowchart of an example method for an interface for a computer system to perform approximate computing (e.g., approximate storage).
Figure 8:
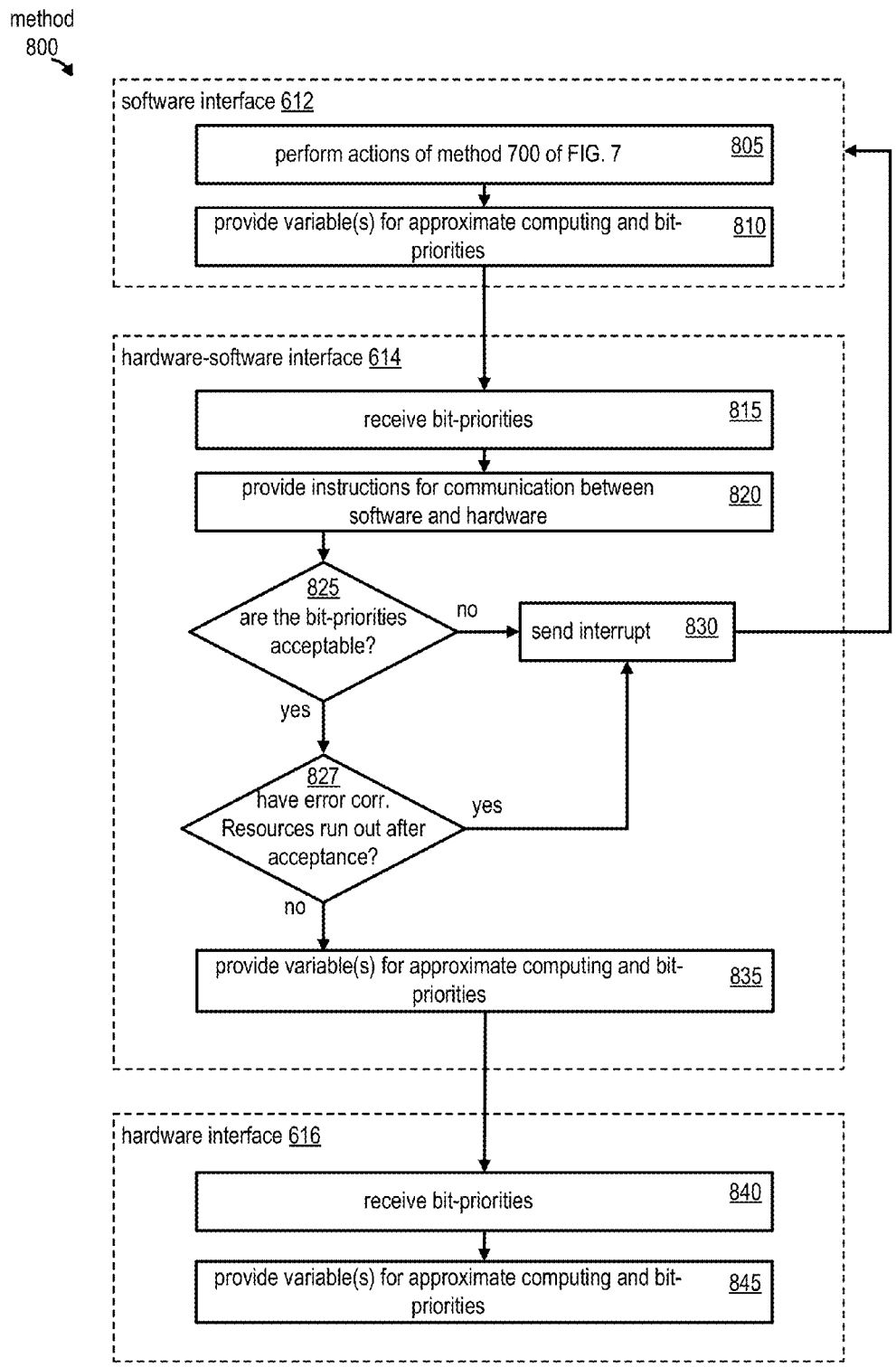
FIG. 8 is a flowchart of an example method for interfaces to operate in collaboration for a computer system to perform approximate computing (e.g., approximate storage).

FIGS. 7 and 8 show methods for implementing various aspects of the system. These figures also show various applications of the system. Since details of system operations are described with reference to other figures, the methods will be presented in a summary fashion in this section.

FIG. 7 is a flowchart of an example method 700 for an interface for enhancing approximate computing (e.g., approximate storage) by a computer system. The method 700 is generally applicable to any interface for enhancing approximate computing by a computer system. In one implementation, a computer system can use the interface 101 of FIG. 1 to carry out the method 700 of FIG. 7.

In an action 705, the computer system identifies variables, variable types, and/or variable groups that are to be processed with approximate precision. For example, the computer system can use the variable-identifier module 102 of FIG. 1 to identify variables, variable types, and/or variable groups that are to be processed according to approximate precision.

In an action 710, the computer system assigns bit-priorities to the variables, variable types, and/or variable groups. For example, the computer system can use the bit priority module 104 of FIG. 1 to assign bit-priorities to the variables, variable types, and/or variable groups. Examples of bit-priority modules are described above with reference to FIGS. 3-5.

FIG. 8 is a flowchart of an example method 800 for interfaces to operate in collaboration for enhancing approximate computing (e.g., approximate storage) by a computer system. In one implementation, the computer system 615 of FIG. 6 can use the software interface 612, the hardware-software interface 614, and/or the hardware interface 616 to carry out the method 800 of FIG. 8.

In an action 805, the computer system performs actions of the method 700 of FIG. 7, as described above. In an action 810 of FIG. 8, the method provides variables for approximate computing and bit-priorities for those variables. In an action 815, the computer system receives the bit-priorities at the hardware-software interface 614. In an action 820, the computer system provides instructions for communication between software and hardware. For example, the computer system 615, at a compile time, can generate these instructions to configure the hardware-software interface 614.

In a decision operation 825, if the computer system determines via the hardware-software interface 614 that the bit-priorities are unacceptable for the hardware, then the method 800 moves to an action 830 where computer system uses the hardware-software interface 614 to send an interrupt or another communication to the software module. As noted above, it may happen that, after the hardware accepts the approximate variable for storage, error correction resources run out. At that point, the hardware may no longer honor the priorities. Accordingly, in a decision operation 827, if the computer system determines that error correction resources have run out, then the method 800 moves to an action 830 where computer system uses the hardware-software interface 614 to send an interrupt or another communication to the software module. However, if the computer system determines the bit-priorities are acceptable for the hardware, and error correction resources have not run out, then the method 800 moves to an action 835 where the computer system provides variables for approximate computing and bit-priorities for those variables.

In an action 840, the computer system receives the bit priorities at the hardware interface 616. In an action 845, the computer system provides variables for approximate computing and bit-priorities for those variables. For example, the hardware interface 616 can be configured with an extension to a page table or independent table that records information about how memory regions are associated to correctness bit priorities, along with a state machine that manages the available error correction entries of a memory region and directs these correction entries such that bit priorities are met (e.g., most important bits have higher priority in error correction allocation).

These methods may include other actions and/or details that are not discussed in these method overviews. Other actions and/or details are discussed with reference to other figures and may be a part of the methods, depending on the implementation.

Example Computer Implementations

Figure 9:
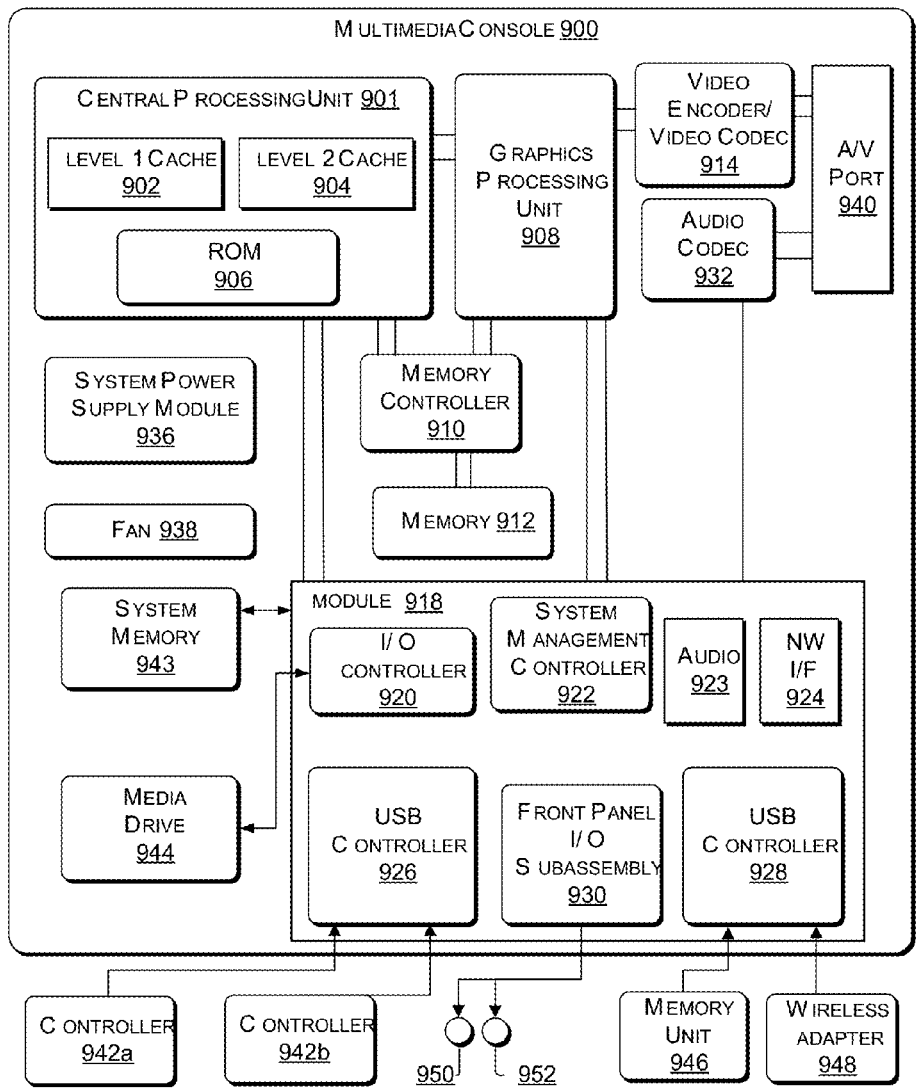
FIG. 9 illustrates an example implementation of a computing environment that may be used to perform approximate computing.

FIG. 9 illustrates an example implementation of a computing environment that may be used to perform approximate computing. The computing environment, such as the system 100 of FIG. 1, may include a multimedia console 900, such as a gaming console. As shown in FIG. 9, the multimedia console 900 has a central processing unit (CPU) 901 having a level 1 cache 902, a level 2 cache 904, and a flash ROM 906. The level 1 cache 902 and a level 2 cache 904 temporarily store data and hence reduce the number of memory access cycles, thereby improving processing speed and throughput. The CPU 901 may be provided having more than one core, and thus, additional level 1 and level 2 caches 902 and 904. The flash ROM 906 may store executable code that is loaded during an initial phase of a boot process when the multimedia console 900 is powered ON.

A graphics processing unit (GPU) 908 and a video encoder/video codec (coder/decoder) 914 form a video processing pipeline for high speed and high resolution graphics processing. Data is carried from the GPU 908 to the video encoder/video codec 914 via a bus. The video processing pipeline outputs data to an A/V (audio/video) port 940 for transmission to a television or other display. A memory controller 910 is connected to the GPU 908 to facilitate processor access to various types of memory 912, such as, but not limited to, a RAM.

The multimedia console 900 includes an I/O controller 920, a system management controller 922, an audio processing unit 923, a network interface controller 924, a first USB host controller 926, a second USB host controller 928 and a front panel I/O subassembly 930 that are preferably implemented on a module 918. The USB controllers 926 and 928 serve as hosts for peripheral controllers 942*a*-942*b*, a wireless adapter 948, and an external memory device 946 (e.g., flash memory, external CD/DVD ROM drive, removable media, etc.). The network interface 924 and/or wireless adapter 948 provide access to a network (e.g., the Internet, home network, etc.) and may be any of a wide variety of various wired or wireless adapter devices including an Ethernet card, a modem, a Bluetooth module, a cable modem, and the like.

System memory 943 is provided to store application data that is loaded during the boot process. A media drive 944 is provided and may comprise a DVD/CD drive, hard drive, or other removable media drive, etc. The media drive 944 may be internal or external to the multimedia console 900. Application data may be accessed via the media drive 944 for execution, playback, etc. by the multimedia console 900. The media drive 944 is connected to the I/O controller 920 via a bus, such as a Serial ATA bus or other high speed connection (e.g., IEEE 1394).

The system management controller 922 provides a variety of service functions related to assuring availability of the multimedia console 900. The audio processing unit 923 and an audio codec 932 form a corresponding audio processing pipeline with high fidelity and stereo processing. Audio data is carried between the audio processing unit 923 and the audio codec 932 via a communication link. The audio processing pipeline outputs data to the A/V port 940 for reproduction by an external audio player or device having audio capabilities.

The front panel I/O subassembly 930 supports the functionality of the power button 950 and the eject button 952, as well as any LEDs (light emitting diodes) or other indicators exposed on the outer surface of the multimedia console 900. A system power supply module 936 provides power to the devices of the multimedia console 900. A fan 938 cools the circuitry within the multimedia console 900.

The CPU 901, GPU 908, memory controller 910, and various other devices within the multimedia console 900 are interconnected via one or more buses, including serial and parallel buses, a memory bus, a peripheral bus, and a processor or local bus using any of a variety of bus architectures. By way of example, such architectures can include a Peripheral Device Interconnects (PCI) bus, PCI-Express bus, etc.

When the multimedia console 900 is powered ON, application data may be loaded from the system memory 943 into memory 912 and/or caches 902, 904 and executed on the CPU 901. The application may present a graphical user interface that provides a consistent user experience when navigating to different media types available on the multimedia console 900. In operation, applications and/or other media contained within the media drive 944 may be launched or played from the media drive 944 to provide additional functionalities to the multimedia console 900.

The multimedia console 900 may be operated as a standalone system by simply connecting the system to a television or other display. In this standalone mode, the multimedia console 900 allows one or more users to interact with the system, watch movies, or listen to music. However, with the integration of broadband connectivity made available through the network interface 924 or the wireless adapter 948, the multimedia console 900 may further be operated as a participant in a larger network community.

When the multimedia console 900 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 900 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 901 at predetermined times and intervals in order to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager (described below) controls the gaming application audio level (e.g., mute, attenuate) when system applications are active.

Input devices (e.g., controllers 942*a* and 942*b*) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 600.

Figure 10:
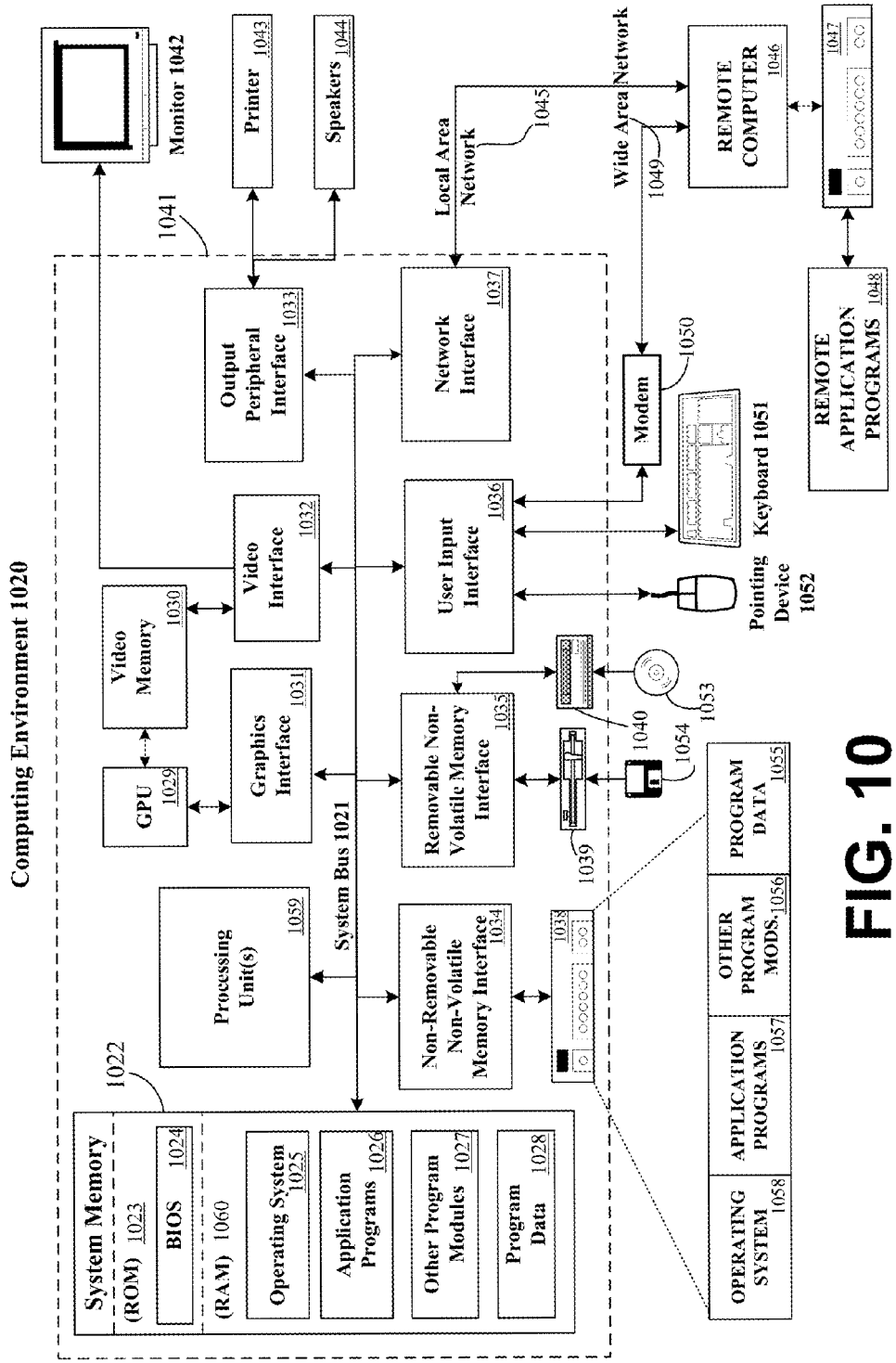
FIG. 10 illustrates another example implementation of a computing environment 1020 that may include the computer system 615 of FIG. 6 configured to perform approximate computing.

FIG. 10 illustrates another example implementation of a computing environment 1020 that may include the computer system 615 of FIG. 6 configured to perform approximate computing. The computing system environment 1020 is only one example of a suitable computing environment and is not intended to suggest any limitation as to the scope of use or functionality of the presently disclosed subject matter. Neither should the computing environment 1020 be interpreted as having any dependency or requirement relating to any one or combination of devices illustrated in the example operating environment 1020. In some implementations, the various depicted computing elements may include circuitry configured to instantiate specific aspects of the present disclosure. For example, the term circuitry used in the disclosure can include specialized hardware devices configured to perform function(s) by firmware or switches. In other example implementations, the term circuitry can include a general purpose processing unit, memory, etc., configured by software instructions that embody logic operable to perform function (s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 10, the computing environment 1020 comprises a computer 1041, which typically includes a variety of computer-readable storage media. Computer-readable storage media can be any available media that can be accessed by computer 1041 and includes both volatile and nonvolatile media, removable and non-removable media. The system memory 1022 includes computer storage media in the form of volatile and/or nonvolatile memory such as ROM 1023 and RAM 1060. A basic input/output system 1024 (BIOS), containing the basic routines that help to transfer information between elements within computer 1041, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027, and program data 1028. FIG. 10 further includes a graphics processor unit (GPU) 1029 having an associated video memory 1030 for high speed and high resolution graphics processing and storage. The GPU 1029 may be connected to the system bus 1021 through a graphics interface 1031.

The computer 1041 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1040 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1040 are typically connected to the system bus 1021 by a removable memory interface, such as interface 1035.

The drives and their associated computer storage media discussed above and illustrated in FIG. 10, provide storage of computer readable instructions, data structures, program modules and other data for the computer 1041. In FIG. 10, for example, hard disk drive 1038 is illustrated as storing operating system 1058, application programs 1057, other program modules 1056, and program data 1055. Note that these devices can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1041 through input devices such as a keyboard 1051 and a pointing device 1052, commonly referred to as a mouse, trackball or touch pad. Other input devices (not shown) may include a microphone, joystick, game pad, satellite dish, scanner, or the like. These and other input devices are often connected to the processing unit 1059 through a user input interface 1036 that is coupled to the system bus, but may be connected by other interface and bus structures, such as a parallel port, game port or a universal serial bus (USB). The cameras 26, 28 and capture device 10 may define additional input devices for the console 1000. A monitor 1042 or other type of display device is also connected to the system bus 1021 via an interface, such as a video interface 1032. In addition to the monitor, computers may also include other peripheral output devices such as speakers 1044 and printer 1043, which may be connected through an output peripheral interface 1033.

The computer 1041 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1041, although a memory storage device 1047 alone has been illustrated in FIG. 10. The logical connections depicted in FIG. 10 include a local area network (LAN) 1045 and a wide area network (WAN) 1049, but may also include other networks. Such networking environments are commonplace in offices, enterprise-wide computer networks, intranets and the Internet.

When used in a LAN networking environment, the computer 1041 is connected to the LAN 1045 through a network interface or adapter 1037. When used in a WAN networking environment, the computer 1041 typically includes a modem 1050 or other means for establishing communications over the WAN 1049, such as the Internet. The modem 1050, which may be internal or external, may be connected to the system bus 1021 via the user input interface 1036, or other appropriate mechanism. In a networked environment, program modules depicted relative to the computer 1041, or portions thereof, may be stored in the remote memory storage device. By way of example, and not limitation, FIG. 10 illustrates remote application programs 1048 as residing on memory device 1047. It will be appreciated that the network connections shown are example and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described implementations were chosen in order to best explain the principles of the inventive system and its practical application to thereby enable others skilled in the art to best utilize the inventive system in various implementations and with various modifications as are suited to the particular use contemplated. It is intended that the scope of the inventive system be defined by the claims appended hereto.

What is claimed is:

1. A system for enhancing approximate computing by a computer system, the system comprising:
one or more variables that are to be processed by the computer system with approximate precision, wherein approximate precision is a precision level at which a hardware device does not guarantee full data-correctness for the one or more variables, and wherein the one or more variables are assigned bit-priorities including relative levels of importance among bits of each of the one or more variables, and wherein the relative levels of importance include at least high-priority bits and low-priority bits, the bit priorities being assigned by a bit priority module, the bit-priority module including a bit mask having a pattern of binary values that the computer system can associate with the one or more variables.

2. The system of claim 1, wherein the one or more variables are assigned bit priorities by a bit mask having a pattern of binary values that the computer system can associate with a variable, and wherein the one or more variables include one or more floating-point numbers, and wherein bit mask is used to assign a sign bit and at least one exponent bit of a floating-point number as being among the high-priority bits.

3. The system of claim 1, wherein one or more variables are assigned bit priorities by a bit mask having a pattern of binary values that the computer system can associate with a variable, and wherein the one or more variables include one or more floating-point numbers, and wherein bit mask is used to assign at least one mantissa bit of the floating-point number as being among the low-priority bits.

4. The system of claim 1, wherein the one or more variables are assigned bit priorities by a bit priority module, the bit-priority module includes a divisor index having a mechanism that identifies a location with a variable, and wherein the divisor index configures the bit-priority module to assign each bit located on one side of the divisor index as being among the high-priority bits.

5. The system of claim 1, wherein the one or more variables are assigned bit priorities by a bit priority module, the bit-priority module includes a priority-value vector having a pattern of values that the computer system can associate with the one or more variables.

6. The system of claim 1, wherein the one or more variables are assigned priorities using a priority-value vector having a pattern of values that the computer system can associate with the one or more variables, and wherein at a corresponding bit where the priority-value vector has a value greater than a predetermined value, the priority-value vector is used to assign the corresponding bit in the one or more variables as being among the high-priority bits.

7. The system of claim 1, wherein the one or more variables are assigned priorities using a priority-value vector having a pattern of values that the computer system can associate with the one or more variables, and wherein the priority-value vector configures the system to assign a sign bit of a variable as having a higher priority than exponent bits of the variable, and wherein the priority-value vector configures the system to assign exponent bits of the variable as having a higher priority than mantissa bits of the variable.

8. The system of claim 1, wherein the system comprises an interface including a software interface configured to receive one or more programming language extensions including syntax that specifies the one or more variables of data that are to be processed by the computer system with approximate precision.

9. The system of claim 1, wherein the system comprises an interface including a hardware-software interface including extensions to an instruction set architecture (ISA) including instructions for communication between a software module and the hardware device.

10. The system of claim 1, wherein the system comprises an interface including a hardware-software interface that enables the hardware device to send an interrupt to a software module to indicate the bit-priorities are unacceptable for the hardware device.

11. The system of claim 1, wherein the system comprises an interface including a hardware interface including one or more extensions that specify bit-priorities according to regions of memory of the hardware device.

12. The system of claim 1, wherein the system comprises an interface including a hardware interface including one or more extensions to a page table that is configured to record information about how memory regions are associated to the bit-priorities for error-correction operations.

13. A computer-implemented method for enhancing approximate computing by a computer system for data representing at least one of picture data, audio data and video data, the computer-implemented method comprising:
identifying one or more variables of the at least one of picture data, audio data and video data that are to be processed by the computer system with approximate precision, wherein approximate precision is a precision level at which a hardware device does not guarantee full data-correctness for the one or more variables; and
assigning bit-priorities to the one or more variables, wherein the bit-priorities include relative levels of importance among bits of each of the one or more variable, and wherein the relative levels of importance include at least high-priority bits and low-priority bits, assigning bit-priorities includes using a bit mask having a pattern of binary values that the computer system can associate with the one or more variables.

14. The computer-implemented method of claim 13, wherein the bit-priorities enable the computer system to make more efficient use of processing circuitry of the hardware device of the computer system by providing low-priority bits for which the hardware device is not obligated to guarantee correctness.

15. The computer-implemented method of claim 13, wherein assigning bit-priorities includes using a priority-value vector having a pattern of values that the computer system can associate with the one or more variables.

16. One or more computer-readable storage media comprising one or more instructions to enhance approximate computing by a computer system, wherein the one or more instructions, when executed, direct one or more processors to perform actions comprising:

assigning bit-priorities to one or more variables that are to be processed by the computer system with approximate precision, wherein approximate precision is a precision level at which a hardware device does not guarantee full data-correctness for the one or more variables, and wherein the bit-priorities include relative levels of importance among bits of each of the one or more variables, and wherein the relative levels of importance include at least high-priority bits and low-priority bits; and providing an interface including a hardware-software interface including extensions to an instruction set architecture (ISA) including instructions for communication between the hardware device and a software module.

17. The one or more computer-readable storage media of claim 16, wherein the one or more instructions, when executed, direct the one or more processors to provide to the hardware device the one or more variables that are to be processed by the computer system with approximate precision.

18. The one or more computer-readable storage media of claim 16, wherein the hardware device includes one or more memory devices, the one or more memory devices using the bit priorities to adjust a level of approximation to allow when storing or accessing data.

\* \* \* \* \*